United States Patent
Diluoffo et al.

(10) Patent No.: US 8,775,784 B2
(45) Date of Patent: Jul. 8, 2014

(54) SECURE BOOT UP OF A COMPUTER BASED ON A HARDWARE BASED ROOT OF TRUST

(75) Inventors: Vincent V. Diluoffo, Sandy Hook, CT (US); Dan P. Dumarot, Cornwall, NY (US); Eugene B. Risi, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 13/294,467

(22) Filed: Nov. 11, 2011

(65) Prior Publication Data

US 2013/0124840 A1 May 16, 2013

(51) Int. Cl.
| | | |
|---|---|---|
| G06F 7/04 | (2006.01) | |
| G06F 9/00 | (2006.01) | |
| G06F 12/14 | (2006.01) | |
| G06F 15/177 | (2006.01) | |

(52) U.S. Cl.
USPC .......................... 713/2; 713/1; 726/2; 726/21

(58) Field of Classification Search
USPC ........................................ 713/1, 2; 726/2, 21
See application file for complete search history.

(56) References Cited

U.S. PATENT DOCUMENTS

| | | | |
|---|---|---|---|
| 7,200,758 | B2 | 4/2007 | Zimmer |
| 7,216,369 | B2 | 5/2007 | Wiseman et al. |
| 7,716,494 | B2 | 5/2010 | Liu et al. |
| 7,725,703 | B2 | 5/2010 | Hunter et al. |
| 7,752,428 | B2 * | 7/2010 | Datta et al. .......................... 713/2 |
| 7,769,993 | B2 | 8/2010 | Carpenter et al. |
| 7,917,762 | B2 | 3/2011 | Lewis et al. |
| 8,321,931 | B2 * | 11/2012 | Zimmer et al. .................. 726/21 |
| 8,386,763 | B1 * | 2/2013 | Spangler et al. .................. 713/2 |
| 2005/0204155 | A1 | 9/2005 | Ravi et al. |
| 2006/0010326 | A1 | 1/2006 | Bade et al. |
| 2006/0117177 | A1 | 6/2006 | Buer |
| 2008/0126779 | A1 | 5/2008 | Smith |
| 2008/0148064 | A1 | 6/2008 | Challener et al. |
| 2008/0184040 | A1 | 7/2008 | Bade et al. |

(Continued)

OTHER PUBLICATIONS

Lohr, Hans et al., "Patterns for Secure Boot and Secure Storage in Computer Systems", 2010 International Conference on Availability, Reliability and Security http://www.trust.rub.de/media/trust/veroeffentlichungen/2010/03/24/tc_patterns-LoSaWi2010.pdf (Obtained from the Internet on Jul. 21, 2011) Feb. 15-18, 2010 , 5 pages.

(Continued)

Primary Examiner — Mark Connolly
(74) Attorney, Agent, or Firm — DeLizio Gilliam, PLLC (57) ABSTRACT

A method includes performing a boot up of a computer having a system on-chip having multiple processors and a nonvolatile read-only machine-readable medium. The boot up includes enabling a first processor of the multiple processors, while maintaining others of the multiple processors in a disabled state. The boot up includes retrieving initial stage instructions from the nonvolatile read-only machine-readable medium. The boot up also includes executing the initial stage instructions and validating multiple stages of firmware separately. The boot up includes, in response to validating the multiple stages of firmware, executing the multiple stages of firmware in consecutive stages of the boot up, wherein executing of each stage of the multiple stages of firmware enables a different set of disabled hardware components of the computer. The boot up also includes validating an operating system and, in response to validation, transferring control of the computer to the operating system.

14 Claims, 6 Drawing Sheets

(56) References Cited

U.S. PATENT DOCUMENTS

| | | |
|---|---|---|
| 2009/0125716 A1 | 5/2009 | Wooten |
| 2009/0150899 A1 | 6/2009 | Tahan |
| 2009/0222653 A1 | 9/2009 | Findeisen et al. |
| 2009/0222910 A1 | 9/2009 | Le Bihan et al. |
| 2009/0276617 A1* | 11/2009 | Grell et al. .................. 713/2 |
| 2011/0099361 A1* | 4/2011 | Shah et al. .................. 713/2 |
| 2011/0107395 A1 | 5/2011 | Takala |

OTHER PUBLICATIONS

Microsoft, , "Secure Startup—Full Volume Encryption: Executive Overview", WinHEC 2005 Version http://www.microsoft.com/whdc/system/platform/pcdesign/secure-start_exec.mspx Apr. 21, 2005 , 8 pages.

* cited by examiner

SECURE BOOT UP OF A COMPUTER BASED ON A HARDWARE BASED ROOT OF TRUST

BACKGROUND

Embodiments of the inventive subject matter generally relate to the field of computers, and, more particularly, to a secure boot up process having a hardware based root of trust.

Conventional computers generally do not provide a secure boot process from the start of power being applied to hardware up to the point where the operating system becomes operational. In particular, with these conventional computers, a large gap of untrusted code can be replaced, injected, etc., thereby providing a vulnerability hole during boot up of the computers.

SUMMARY

A method includes performing a boot up of a computer having a system on-chip having multiple processors and a nonvolatile read-only machine-readable medium. The boot up includes enabling a first processor of the multiple processors, while maintaining others of the multiple processors in a disabled state. The boot up includes retrieving, by the first processor, initial stage instructions from the nonvolatile read-only machine-readable medium. The boot up also includes executing, in the first processor, the initial stage instructions. The boot up includes validating, at least in part by executing the initial stage instructions by the first processor, multiple stages of firmware separately, wherein the validating of the multiple stages of firmware includes performing at least one cryptographic operation. The boot up includes, in response to validating the multiple stages of firmware, executing the multiple stages of firmware in consecutive stages of the boot up, wherein executing of each stage of the multiple stages of firmware enables a different set of disabled hardware components of the computer. The boot up also includes validating, as part of execution of at least one of the multiple stages of firmware, an operating system, wherein the validating of the operating system includes performing at least one different cryptographic operation. The boot up includes, in response to validation of the operating system, transferring control of the computer to the operating system.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to specific cryptographic operations, any type of cryptographic operations can be used to protected the instructions executed in the secure boot up. In other instances, well-known instruction instances, protocols, structures and techniques have not been shown in detail in order not to obfuscate the description.

Some example embodiments provide a secure boot process where each layer of the computer can be validated using various integrity and/or confidentiality protection mechanisms. Some example embodiments can leverage a Trusted Platform Module (TPM) where both secure and trusted boot are established from a Hardware based Root of Trust.

In some example embodiments, a system is executed which employs hardware and software methods to ensure that the intended software is running on the intended hardware configuration by establishing a hardware based root of trust before the first processor instruction. Some example embodiments include multiple system on-chips, wherein each of these chips includes multiple processors. Additionally, the multiple system on-chips can include different types of machine-readable media. For example, the system on-chips can include a Read Only Memory (ROM), a dynamic real-time programmable memory, etc. In some example embodiments, the system can include different types of machine-readable media that is separate from the system on-chips. For example, the system can include a Battery Backed Random Access Memory (BBRAM), a RAM, a reprogrammable nonvolatile machine-readable medium (e.g., Flash memory), etc.

In some example embodiments, the on-chip ROM can be configured to store initial stage instructions, which can embody logic for validation of a next step in the trust chain. The logic that is executed from the ROM can be called immutable—meaning that the data stored therein cannot be altered. Also, as part of the boot up of the system, different cryptographic operations can be performed. Such cryptographic operations can be performed in software, a hardware-based cryptographic processor, or a combination thereof.

The on-chip dynamic real-time programmable memory can be configured to store bit values during the manufacturing process. These bit values provide the logic for how the trust chain is going to be checked using a digital signature, an authenticated encryption or a combination thereof. In some example embodiments, at least one of the on-chip dynamic real-time programmable memory and the BBRAM can be configured to store one or more hardware root cryptographic keys using for validation during the boot up. Also, if present, the BBRAM can also be configured to store other software layer cryptographic keys including application-based keys.

The system can also comprise a TPM that includes Platform Configuration Registers (PCRs) for storage of data therein. Also, as further described below, some of the components can be shared across multiple system on-chips. For example, multiple system on-chips can share a BBRAM and TPM.

Upon Power On Rest (POR), one or more processors can execute initial stage instructions from its embedded ROM and validate it's code that provides boot up using at least one of a number of cryptographic methods.

The cryptographic key stored in the BBRAM or the on-chip dynamic real-time programmable memory can be fetched and used by the initial stage instructions to validate the next stage of the boot up. The next stage can be separated into multiple stages. For example, a firmware that is executed after the initial stage instructions can be separated into a first stage firmware and a second stage firmware. In some example embodiments, the firmware can be stored in the nonvolatile programmable machine-readable medium that is external to the system on-chip. A first stage of this next stage can enable a first group of hardware components. For example, the first stage instructions can enable only those hardware components needed to execute the first stage instructions. As an example, the first stage instructions can enable the TPM, the cryptographic processor and the limited bus logic to access the TPM and the cryptographic processor.

The firmware can be stored and protected using at least one of a number of cryptographic methods. For example, the first stage firmware and the second stage firmware can be protected through a digital signature, authenticated encryption, etc. In some example embodiments, the protection of the first stage firmware and the second stage firmware can be based on same or different cryptographic key.

The initial stage instructions stored in the on-chip ROM can perform validation of the first stage firmware. Upon validation, control can be transferred to the first stage firmware. The first stage firmware can then perform validation of the second stage firmware. Upon validation, control can be transferred to the second stage firmware. The second stage firmware can the perform validation of the operating system or virtual manager. Upon validation, control can be transferred to the operating system or the virtual manager, thereby completing the boot up of the system.

As further described below, as each layer is executed a small amount of the hardware is enabled therefore reducing risk and potential vulnerabilities. Also, each layer can write and extend the PCR values in the TPM. This secure and trusted boot process establishes a higher level of assurance that the next layer has been validated against the lower layer and creates a root of trust. Also, some example embodiments provide a method for protecting cryptographic keys and provide a cryptographic configuration capability for how the software layers are to be validated.

Figure 1:
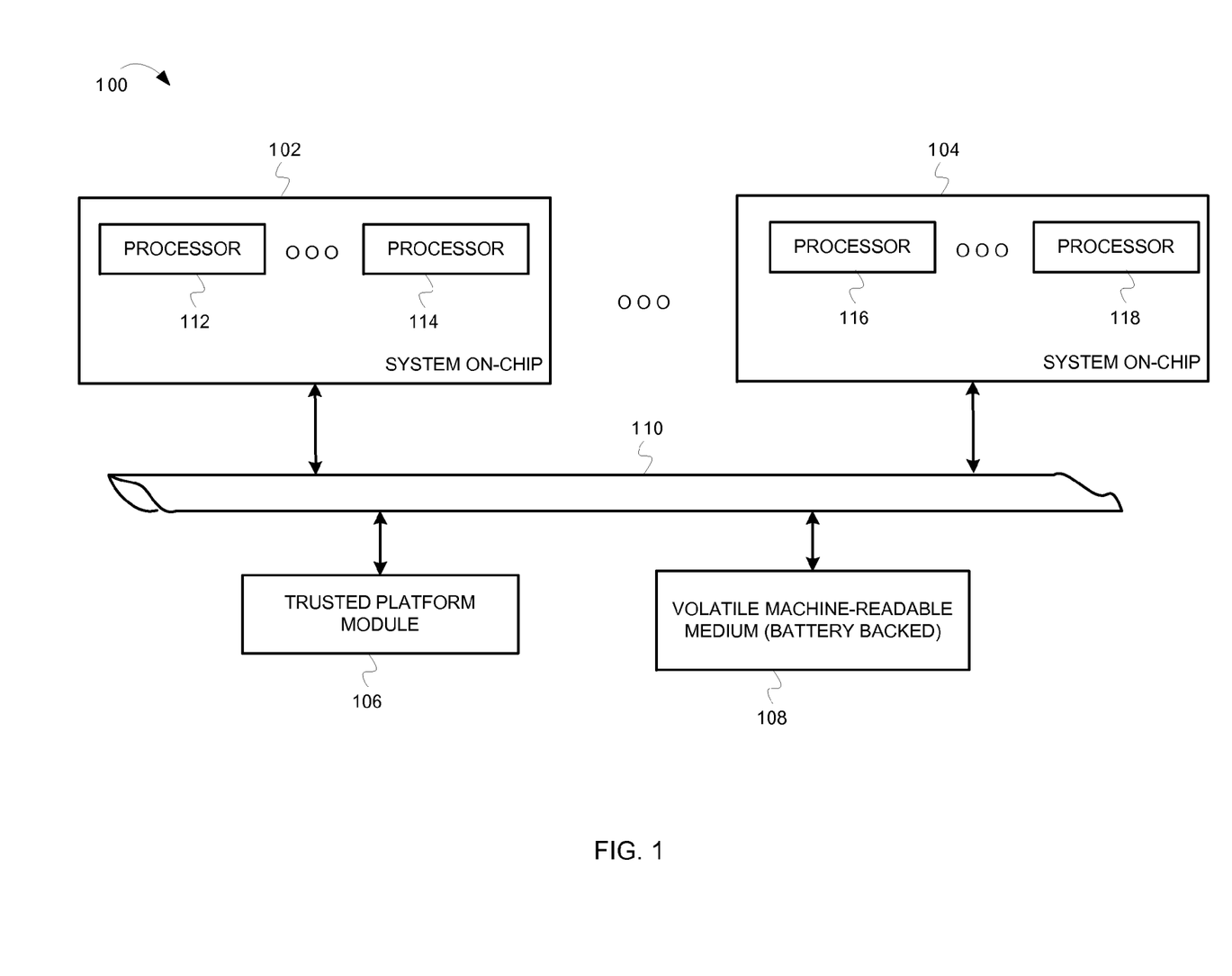
FIG. 1 depicts a block diagram of a computer having multiple systems on-chip that include multiple processor cores and other components of the computer for providing a secure boot up processing having a hardware based root of trust, according to some example embodiments.

FIG. 1 depicts a block diagram of a computer having multiple systems on-chip that include multiple processor cores and other components of the computer for providing a secure boot up having a hardware based root of trust, according to some example embodiments. In particular, FIG. 1 depicts a computer 100 that includes a number of system on-chips (shown as a system on-chip 102 and a system on-chip 104), a Trusted Platform Module (TPM) 106, and a battery backed volatile machine-readable medium 108 (e.g., BBRAM) that are communicatively coupled together through a communications bus 110. The system on-chip 102 includes a number of processors (shown as a processor 112 and a processor 114). The system on-chip 104 includes a number of processors (shown as a processor 116 and a processor 118). The TPM 106 and the battery backed volatile machine-readable medium 108 can be shared by the different system on-chips 102-104. For example, both the processor 112 in the system on-chip 102 and the processor 116 in the system on-chip 104 can store data in either of the TPM 106 and the battery-backed volatile machine-readable medium 108. More detailed block diagrams of two different embodiments of a system on-chip and other components of the computer for providing a secure boot up are now described in reference to FIGS. 2 and 3.

Figure 2:
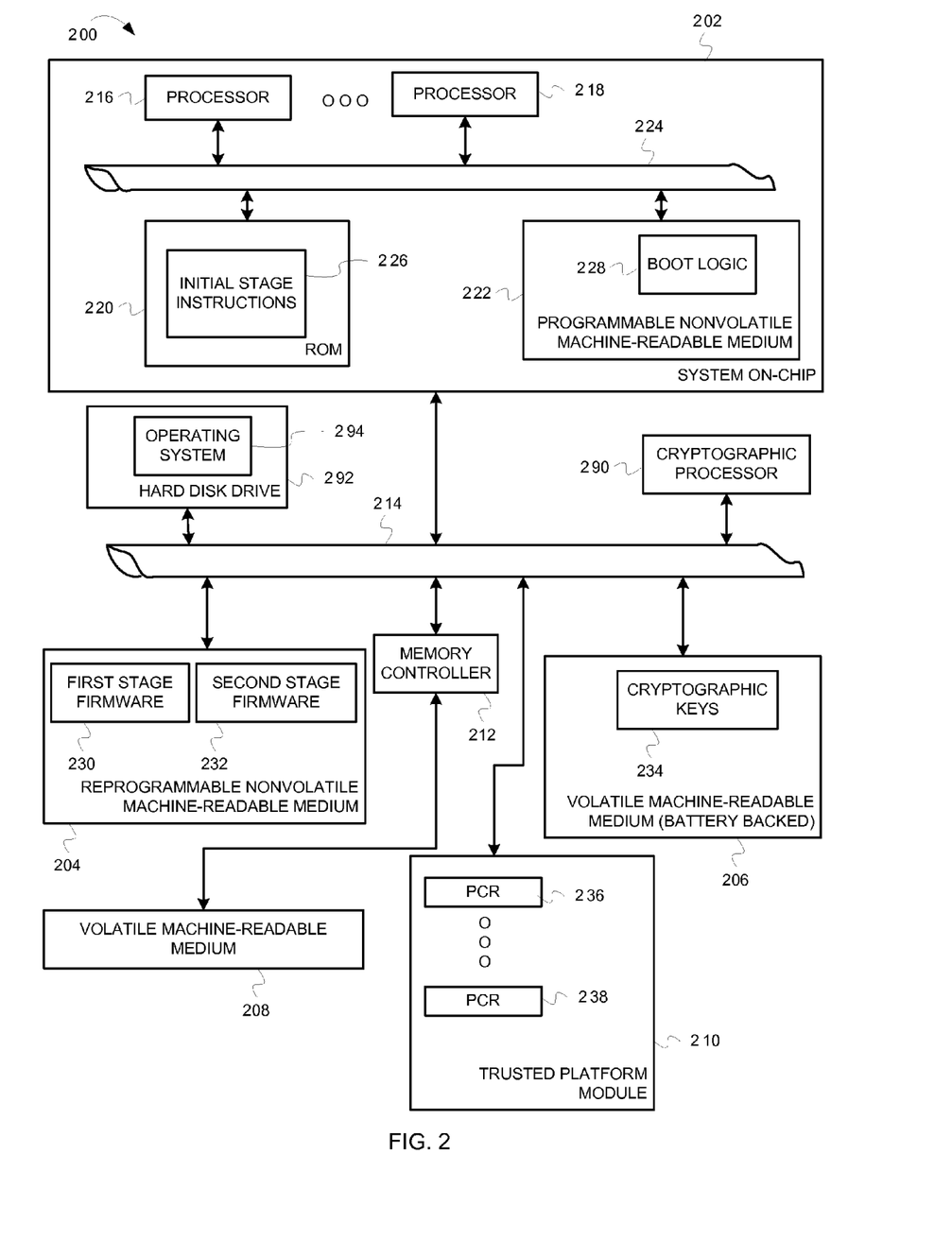
FIG. 2 depicts a more detailed block diagram of one of the multiple systems on-chip that include multiple processor cores and other components of the computer for providing a secure boot up processing having a hardware based root of trust, according to some example embodiments.

FIG. 2 depicts a more detailed block diagram of one of the multiple systems on-chip that include multiple processor cores and other components of the computer for providing a secure boot up processing having a hardware based root of trust, according to some example embodiments. In particular, FIG. 2 depicts a computer 200 that includes a system on-chip 202, a reprogrammable nonvolatile machine-readable medium 204, a battery backed volatile machine-readable medium 206, a memory controller 212, a cryptographic processor 290, a hard disk drive 292, a volatile machine-readable medium 208, and a TPM 210. The system on-chip 202, the reprogrammable nonvolatile machine-readable medium 204, the battery backed volatile machine-readable medium 206, the cryptographic processor 290, the hard disk drive 292, the volatile machine-readable medium 208 (through the memory controller 212), and a TPM 210 are communicatively coupled together through a communications bus 214.

The system on-chip 202 includes a number of processors (shown as a processor 216 and a processor 218), a read only machine-readable medium (a ROM 220), and a programmable nonvolatile machine-readable medium 222 that are communicatively coupled together through a communications bus 224. The ROM 220 is configured to store initial stage instructions 226. The programmable nonvolatile machine-readable medium 222 is configured to store boot logic 228. The hard disk drive 292 can be any type of nonvolatile data storage device (e.g., magnetic data storage device) and is configured to store an operating system 294 that is to be executed after the secure boot up is complete.

In some example embodiments, the reprogrammable nonvolatile machine-readable medium 204 comprises a Flash memory. The reprogrammable nonvolatile machine-readable medium 204 is configured to store multiple stages of firmware that are executed as part of the boot up. In this example, the reprogrammable nonvolatile machine-readable medium 204 is configured to store two different stages of firmware—a first stage firmware 230 and a second stage firmware 232. In some example embodiments, the battery backed volatile machine-readable medium 206 comprises BBRAM. In this example, the battery backed volatile machine-readable medium 206 is configured to store one or more cryptographic keys 234. In some other example embodiments, the programmable nonvolatile machine-readable medium 222 is configured to store one or more of the cryptographic keys 234. In some example embodiments, the volatile machine-readable medium 208 comprises a general purpose Random Access Memory (RAM). The TPM 210 includes a number of Platform Configuration Registers (PCRs) that can store data therein. Accordingly, as shown instead of storing cryptographic keys in the TPM 210 (as is typically performed in conventional system), the cryptographic keys can be stored in machine-readable media (either on-chip or off-chip).

For operation for boot up of the computer 200, the boot up process is performed in a series of stages, wherein a limited number of hardware components of the computer 200 are enabled at each stage, thereby reducing risk and potential vulnerabilities. Upon power on or reset of the computer 200, one of the processors is initially enabled, while the other processors are initially disabled. For example, the processor 216 is enabled during initial boot up, while the processor 218 remains disabled. The ROM 220 and associated logic for communications between the ROM 220 and the processor 216 are also enabled.

As part of the first stage of the boot up, the processor 216 retrieves the initial stage instructions 226 from the ROM 220.

The processor 216 executes the initial stage instructions 226. As part of execution of the initial stage instructions, the processor 216 enables the programmable nonvolatile machine-readable medium 222, the reprogrammable nonvolatile machine-readable medium 204 and the bus logic on the communications bus 214 for access of the reprogrammable nonvolatile machine-readable medium 204 by the system on-chip 202. Also as part of execution of the initial stage instructions, the processor 216 retrieves the boot logic 228 and the first stage firmware 230 from the reprogrammable nonvolatile-readable medium 204.

The processor 216 reads the boot logic 228 which identifies definitions on the type of cryptographic operations that are to be performed during the boot up and the location of the cryptographic keys that are used during the operation. In particular, the boot logic 228 can identify the type of cryptographic operations and location of cryptographic keys used to authenticate each of the multiple stages of firmware, the boot loader, and the operating system or hypervisor. Each of the multiple stages of firmware, the boot loader, and the operating system or hypervisor can be protected by confidentiality and integrity operations (e.g., encryption, Hash-based Message Authentication Code (HMAC), digitally signed and or hash operation) or integrity operations only (digitally signed). For example, the boot logic 228 can include an indicator that the first stage firmware is protected by a digital signature with a cryptographic key that is stored in the battery backed volatile machine-readable medium. In another example, the boot logic 228 can include an indicator that the second stage firmware is encrypted with a cryptographic key that is stored in the programmable nonvolatile machine-readable medium 222. In some example embodiments, a same cryptographic key or different cryptographic keys can be used for the different cryptographic operations during the boot up. Also, in some example embodiments, a same cryptographic operation or different cryptographic operations can be performed at the different stages of boot up. Accordingly, the confidentiality and integrity operations allow each stage of the boot up to have its own mechanism of protection. In particular, each stage of the boot up can use same or different cryptographic operation and can have its own cryptographic key or can use the same cryptographic key. Therefore, some example embodiments allow the different stages of boot up to have different degrees of protection and allow different cryptographic keys to perform that protection. This flexibility can enable different chip vendors and manufacturers to load different stages of firmware on a system wherein each vendor and manufacturer may not have access to others cryptographic keys. Additionally, the operating system vendors may or may not have access to the lower stages of the software stack (i.e., multiples firmware stages).

In some example embodiments, there is also access control and authentication to the battery backed volatile machine-readable medium 206. In particular, the battery backed volatile machine-readable medium 206 can have individual locations for storage of different cryptographic keys, wherein each of the keys in the different individual locations are protected by a secret value (e.g., master key, password, etc.). Such embodiments enable each owner of a cryptographic key their own slot key location in the battery backed volatile machine-readable medium 206. Therefore, each of the vendors and manufacturers of different stages of the boot up can have their own cryptographic key that is protected from the other vendors and manufacturers of different stages of the boot up. As part of execution of the initial stage instructions, the processor 216 retrieves the cryptographic key needed for validation of the first stage firmware 230 from the location defined by the boot logic 228. If the cryptographic key is stored in the battery backed nonvolatile machine-readable medium 206, the processor 216 enables the battery backed nonvolatile machine-readable medium 206 prior to retrieving the cryptographic key. The processor 216 then validates the first stage firmware 230. The processor 216 can validate based on one or more cryptographic operations and cryptographic keys using the retrieved cryptographic key. For example, the processor 216 can perform a digital signature across the first stage firmware 230 and compare this generated digital signature with a digital signature that is stored with the first stage firmware 230 (e.g., appended thereto). In another example, the processor 216 can perform a decryption of the first stage firmware 230 that is encrypted with the retrieved cryptographic key. In some example embodiments, the first stage firmware can be validated using more than one cryptographic operation (e.g., encryption and digital signature).

If the first stage firmware 230 is properly validated, the processor 216 transfers control of the boot up from the initial stage instructions 226 to the first stage firmware 230. In some example embodiments, prior to transfer to the first stage firmware 230, the processor 216 (as part of execution of the initial stage instructions 226) e-fuses the boot logic 228 in the programmable nonvolatile machine-readable medium 222 and precludes access to initial stage instructions stored in the ROM 220 to prevent access the code stored in the programmable nonvolatile machine-readable medium 222 and the ROM 220 by higher levels of software to be executed. This starts the next stage of the boot up. As part of execution of the first stage firmware 230, the processor 216 enables the cryptographic processor 290, the TPM 210, and associated logic for communications between the cryptographic processor 290, the TPM 210, and the processor 216. Also as part of execution of the first stage firmware 230, the processor 216 can generate a hash across an image of the first stage firmware 230. The processor 216 can then store a value of the hash into one of the PCRs in the TPM 210. As part of execution of the first stage firmware 230, the processor 216 then retrieves the second stage firmware 232 from the reprogrammable nonvolatile-readable medium 204.

The processor 216 then instructs the cryptographic processor 290 to validate the second stage firmware 232. The cryptographic processor 290 can validate based on one or more cryptographic operations and cryptographic keys using the retrieved cryptographic key. For example, the cryptographic processor 290 can perform a digital signature across the second stage firmware 232 and compare this generated digital signature with a digital signature that is stored with the second stage firmware 232 (e.g., appended thereto). In another example, the cryptographic processor 290 can perform a decryption of the second stage firmware 232 that is encrypted with the retrieved cryptographic key. In some example embodiments, the second stage firmware 232 can be validated using more than one cryptographic operation (e.g., encryption and digital signature). Also, the processor 216 may be required to retrieve a cryptographic key based on the definitions in the boot logic 228 (if a different cryptographic key is used for validating the second stage firmware 232).

If the second stage firmware 232 is properly validated, the processor 216 transfers control of the boot up from the first stage firmware 230 to the second stage firmware 232. This starts the next stage of the boot up. As part of execution of the second stage firmware 232, the processor 216 can enable the remaining unenabled components of the computer 200. For example, the processor 216 can enable the other processors cores that are not yet enabled in the system on-chip 202 and the memory controller 212 to enable access to the volatile machine-readable medium 208, the volatile machine-readable medium 208, the hard disk drive 292, and associated logic for communications between these components and the processor 216. Also as part of execution of the second stage firmware 232, the processor 216 can generate a hash across an image of the second stage firmware 232. The processor 216 can then store a value of the hash into one of the PCRs in the TPM 210. As part of execution of the second stage firmware 232, the processor 216 then retrieves the operating system 294 from the hard disk drive 292.

The processor 216 then instructs the cryptographic processor 290 to validate the operating system 294. The cryptographic processor 290 can validate based on one or more cryptographic operations and cryptographic keys using the retrieved cryptographic key. For example, the cryptographic processor 290 can perform a digital signature across the operating system 294 and compare this generated digital signature with a digital signature that is stored with the operating system 294 (e.g., appended thereto). In another example, the cryptographic processor 290 can perform a decryption of the operating system 294 that is encrypted with the retrieved cryptographic key. In some example embodiments, the operating system 294 can be validated using more than one cryptographic operation (e.g., encryption and digital signature). Also, the processor 216 may be required to retrieve a cryptographic key based on the definitions in the boot logic 228 (if a different cryptographic key is used for validating the operating system 294).

If the operating system 294 is properly validated, the processor 216 transfers control of the boot up from the first stage firmware 230 to the operating system 294. This starts the next stage of the boot up. As part of execution of the operating system 294, the processor 216 can generate a hash across an image of the operating system 294. The processor 216 can then store a value of the hash into one of the PCRs in the TPM 210. The boot up of the computer 200 is then complete. In some example embodiments, prior to execution of the operating system 294 after the boot up, a process (either local or remote to the computer 200) can validate the hash values stored in the PCRs in the TPM 210.

Figure 3:
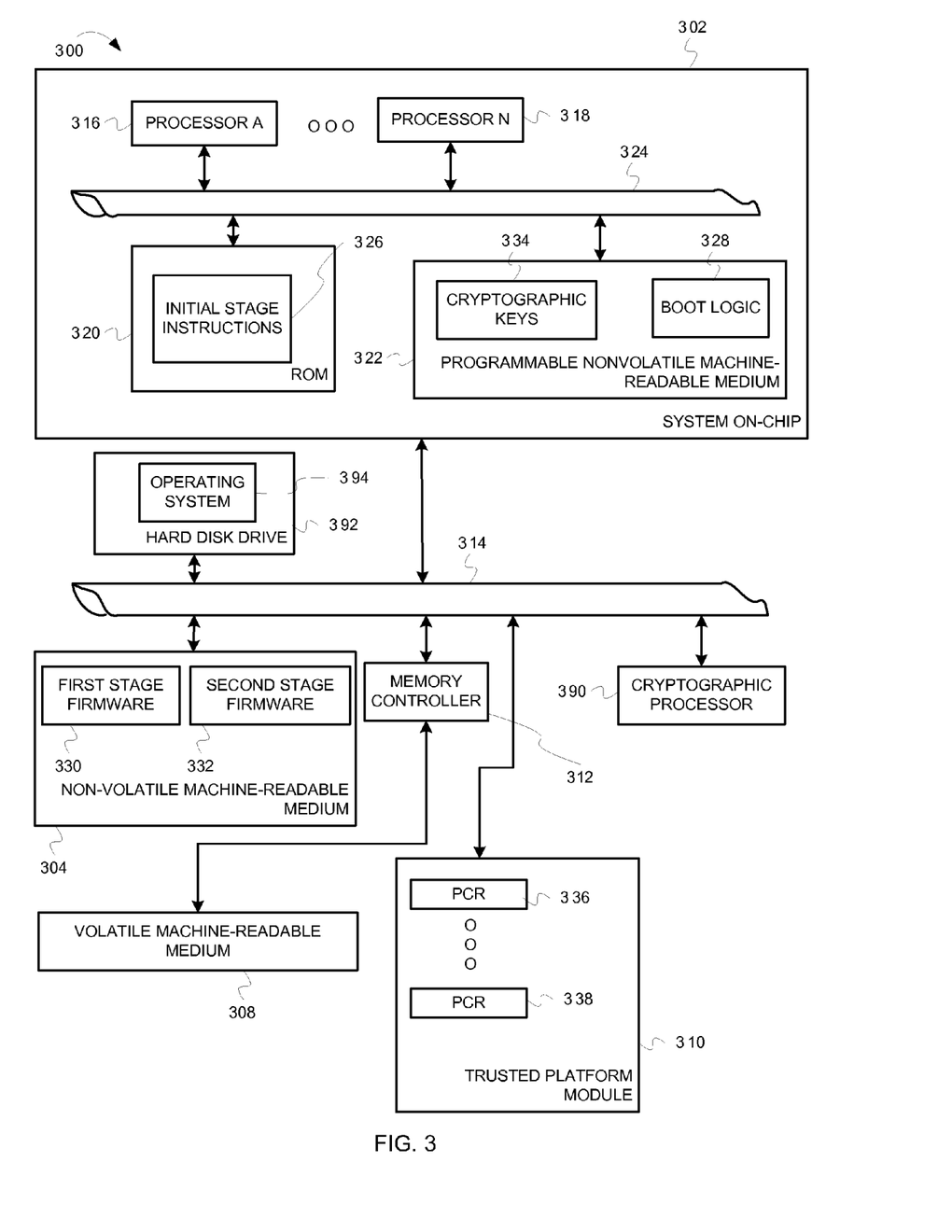
FIG. 3 depicts a more detailed block diagram of one of the multiple systems on-chip that include multiple processor cores and other components of the computer for providing a secure boot up processing having a hardware based root of trust, according to some other example embodiments.

FIG. 3 depicts a more detailed block diagram of one of the multiple systems on-chip that include multiple processor cores and other components of the computer for providing a secure boot up processing having a hardware based root of trust, according to some other example embodiments. In contrast to the computer 200 of FIG. 2, a computer 300 of FIG. 3 does not include a battery backed volatile machine-readable medium for storage of the cryptographic keys. Accordingly, the cryptographic keys are stored in the on-chip programmable nonvolatile machine-readable medium along with the boot logic. Also, the boot logic in this example will direct the processor that is performing the boot up of the new location of the cryptographic keys (as is now described).

FIG. 3 depicts the computer 300 that includes a system on-chip 302, a reprogrammable nonvolatile machine-readable medium 304, a memory controller 312, a cryptographic processor 390, a hard disk drive 392, a volatile machine-readable medium 308, and a TPM 310. The system on-chip 302, the reprogrammable nonvolatile machine-readable medium 304, the cryptographic processor 390, the hard disk drive 392, the volatile machine-readable medium 308 (through the memory controller 312), and the TPM 310 are communicatively coupled together through a communications bus 314.

The system on-chip 302 includes a number of processors (shown as a processor 316 and a processor 318), a read only machine-readable medium (a ROM 320), and a programmable nonvolatile machine-readable medium 322 that are communicatively coupled together through a communications bus 324. The ROM 320 is configured to store initial stage instructions 326. The programmable nonvolatile machine-readable medium 322 is configured to store boot logic 328. The hard disk drive 392 can be any type of nonvolatile data storage device (e.g., magnetic data storage device) and is configured to store an operating system 394 that is to be executed after the secure boot up is complete.

In some example embodiments, the reprogrammable nonvolatile machine-readable medium 304 comprises a Flash memory. The reprogrammable nonvolatile machine-readable medium 304 is configured to store multiple stages of firmware that are executed as part of the boot up. In this example, the reprogrammable nonvolatile machine-readable medium 304 is configured to store two different stages of firmware—a first stage firmware 330 and a second stage firmware 332. In this example, the programmable nonvolatile machine-readable medium 322 is configured to store one or more of the cryptographic keys 334. In some example embodiments, the volatile machine-readable medium 308 comprises a general purpose Random Access Memory (RAM). The TPM 310 includes a number of Platform Configuration Registers (PCRs) that can store data therein. Accordingly, as shown instead of storing cryptographic keys in the TPM 310 (as is typically performed in conventional system), the cryptographic keys can be stored in machine-readable media (either on-chip or off-chip).

For operation for boot up of the computer 300, the boot up process is performed in a series of stages, wherein a limited number of hardware components of the computer 300 are enabled at each stage, thereby reducing risk and potential vulnerabilities. Upon power on or reset of the computer 300, one of the processors is initially enabled, while the other processors are initially disabled. For example, the processor 316 is enabled during initial boot up, while the processor 318 remains disabled. The ROM 320 and associated logic for communications between the ROM 320 and the processor 316 are also enabled.

As part of the first stage of the boot up, the processor 316 retrieves the initial stage instructions 326 from the ROM 320. The processor 316 executes the initial stage instructions 326. As part of execution of the initial stage instructions, the processor 316 enables the programmable nonvolatile machine-readable medium 322, the reprogrammable nonvolatile machine-readable medium 304 and the bus logic on the communications bus 314 for access of the reprogrammable nonvolatile machine-readable medium 304 by the system on-chip 302. Also as part of execution of the initial stage instructions, the processor 316 retrieves the boot logic 328 and the first stage firmware 330 from the reprogrammable nonvolatile-readable medium 304.

The boot logic 328 includes definitions on the type of cryptographic operations that are to be performed during the boot up and the location of the cryptographic keys that are used during the operation. For example, the boot logic 328 can include an indicator that the first stage firmware is protected by a digital signature with a cryptographic key that is stored in the battery backed volatile machine-readable medium. In another example, the boot logic 328 can include an indicator that the second stage firmware is encrypted with a cryptographic key that is stored in the programmable nonvolatile machine-readable medium 322. In some example embodiments, a same cryptographic key or different cryptographic keys can be used for the different cryptographic operations during the boot up. Also, in some example embodiments, a same cryptographic operation or different cryptographic operations can be performed at the different stages of boot up.

As part of execution of the initial stage instructions, the processor 316 retrieves the cryptographic key needed for validation of the first stage firmware 330 from the location defined by the boot logic 328. In this example, the processor 316 retrieves the cryptographic key 334 from the programmable nonvolatile machine-readable medium 322. The processor 316 then validates the first stage firmware 330. The processor 316 can validate based on one or more cryptographic operations and cryptographic keys using the retrieved cryptographic key. For example, the processor 316 can perform a digital signature across the first stage firmware 330 and compare this generated digital signature with a digital signature that is stored with the first stage firmware 330 (e.g., appended thereto). In another example, the processor 316 can perform a decryption of the first stage firmware 330 that is encrypted with the retrieved cryptographic key. In some example embodiments, the first stage firmware can be validated using more than one cryptographic operation (e.g., encryption and digital signature).

If the first stage firmware 330 is properly validated, the processor 316 transfers control of the boot up from the initial stage instructions 326 to the first stage firmware 330. This starts the next stage of the boot up. As part of execution of the first stage firmware 330, the processor 316 enables the cryptographic processor 390, the TPM 310, and associated logic for communications between the cryptographic processor 390, the TPM 310, and the processor 316. Also as part of execution of the first stage firmware 330, the processor 316 can generate a hash across an image of the first stage firmware 330. The processor 316 can then store a value of the hash into one of the PCRs in the TPM 310. As part of execution of the first stage firmware 330, the processor 316 then retrieves the second stage firmware 332 from the reprogrammable nonvolatile-readable medium 304.

The processor 316 then instructs the cryptographic processor 390 to validate the second stage firmware 332. The cryptographic processor 390 can validate based on one or more cryptographic operations and cryptographic keys using the retrieved cryptographic key. For example, the cryptographic processor 390 can perform a digital signature across the second stage firmware 332 and compare this generated digital signature with a digital signature that is stored with the second stage firmware 332 (e.g., appended thereto). In another example, the cryptographic processor 390 can perform a decryption of the second stage firmware 332 that is encrypted with the retrieved cryptographic key. In some example embodiments, the second stage firmware 332 can be validated using more than one cryptographic operation (e.g., encryption and digital signature). Also, the processor 316 may be required to retrieve a cryptographic key based on the definitions in the boot logic 328 (if a different cryptographic key is used for validating the second stage firmware 332).

If the second stage firmware 332 is properly validated, the processor 316 transfers control of the boot up from the first stage firmware 330 to the second stage firmware 332. This starts the next stage of the boot up. As part of execution of the second stage firmware 332, the processor 316 can enable the remaining unenabled components of the computer 300. For example, the processor 316 can enable the other processors cores that are not yet enabled in the system on-chip 302 and the memory controller 312 to enable access to the volatile machine-readable medium 308, the volatile machine-readable medium 308, the hard disk drive 392, and associated logic for communications between these components and the processor 316. Also as part of execution of the second stage firmware 332, the processor 316 can generate a hash across an image of the second stage firmware 332. The processor 316 can then store a value of the hash into one of the PCRs in the TPM 310. As part of execution of the second stage firmware 332, the processor 316 then retrieves the operating system 394 from the hard disk drive 392.

The processor 316 then instructs the cryptographic processor 390 to validate the operating system 394. The cryptographic processor 390 can validate based on one or more cryptographic operations and cryptographic keys using the retrieved cryptographic key. For example, the cryptographic processor 390 can perform a digital signature across the operating system 394 and compare this generated digital signature with a digital signature that is stored with the operating system 394 (e.g., appended thereto). In another example, the cryptographic processor 390 can perform a decryption of the operating system 394 that is encrypted with the retrieved cryptographic key. In some example embodiments, the operating system 394 can be validated using more than one cryptographic operation (e.g., encryption and digital signature). Also, the processor 316 may be required to retrieve a cryptographic key based on the definitions in the boot logic 328 (if a different cryptographic key is used for validating the operating system 394).

If the operating system 394 is properly validated, the processor 316 transfers control of the boot up from the first stage firmware 330 to the operating system 394. This starts the next stage of the boot up. As part of execution of the operating system 394, the processor 316 can generate a hash across an image of the operating system 394. The processor 316 can then store a value of the hash into one of the PCRs in the TPM 310. The boot up of the computer 300 is then complete. In some example embodiments, prior to execution of the operating system 394 after the boot up, a process (either local or remote to the computer 300) can validate the hash values stored in the PCRs in the TPM 310.

Figure 4:
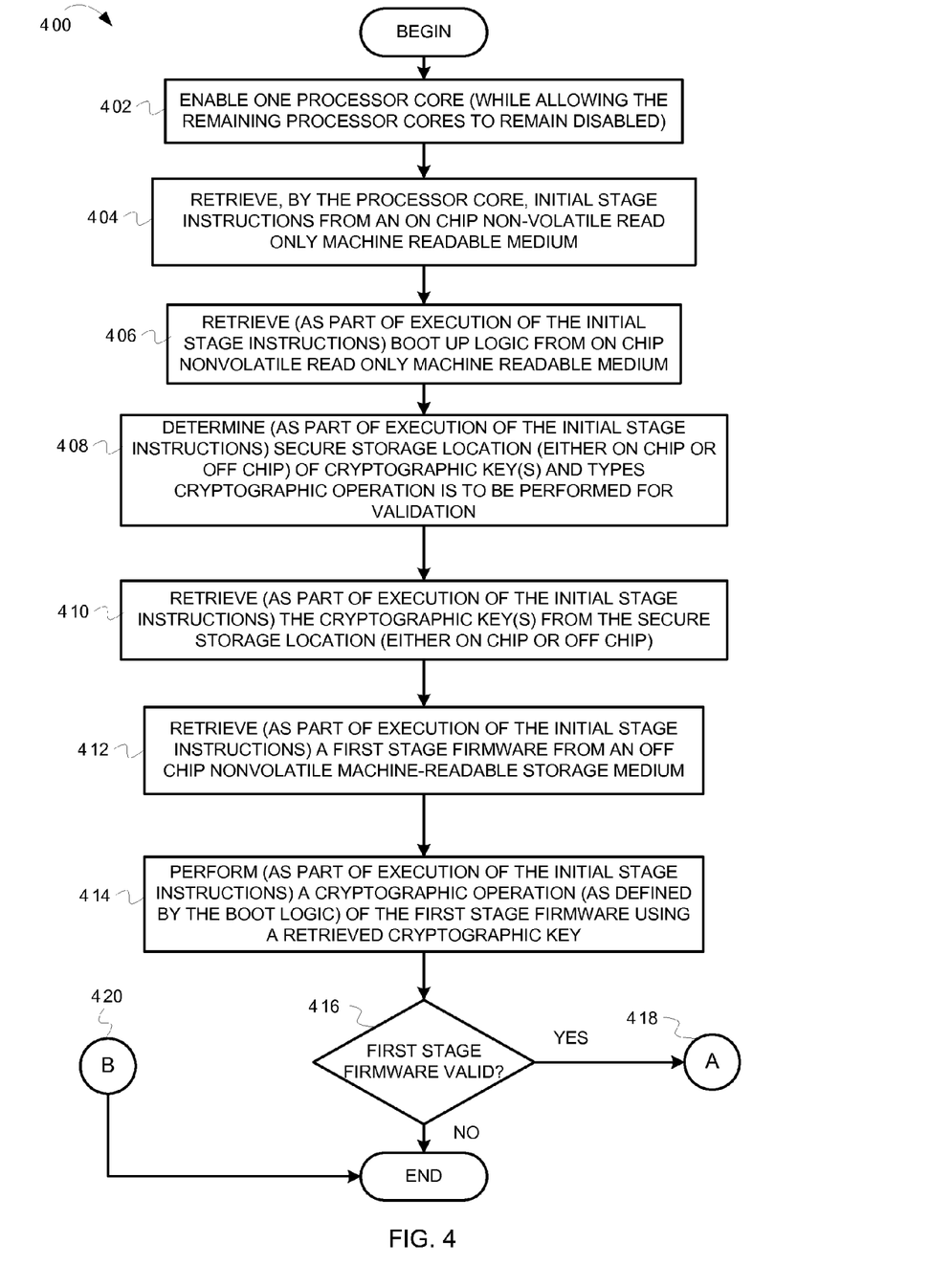
FIGS. 4-6 depict flowcharts for providing a secure boot up having a hardware based root of trust using digital signatures, according to some example embodiments.
Figure 5:
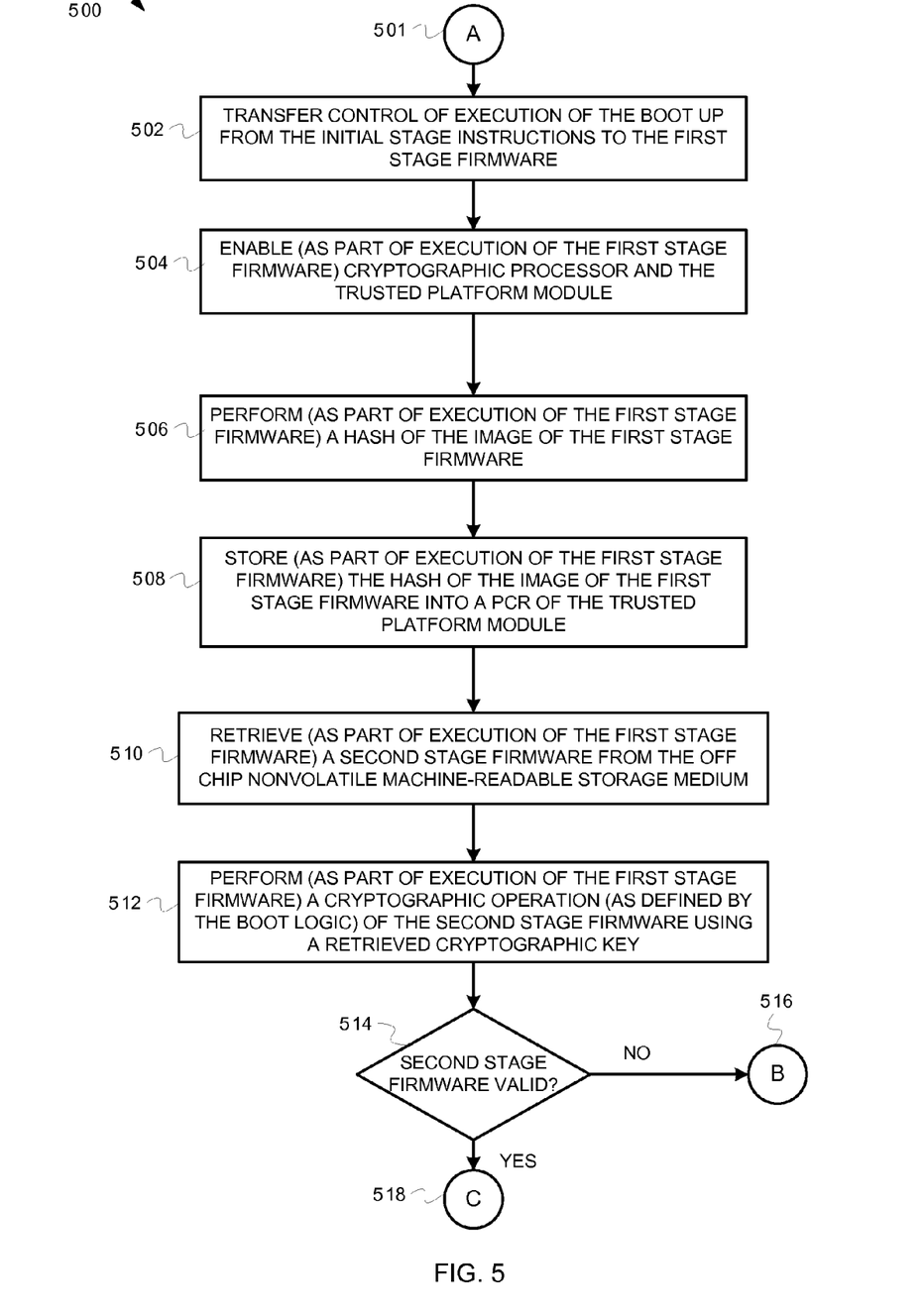
Figure 6:
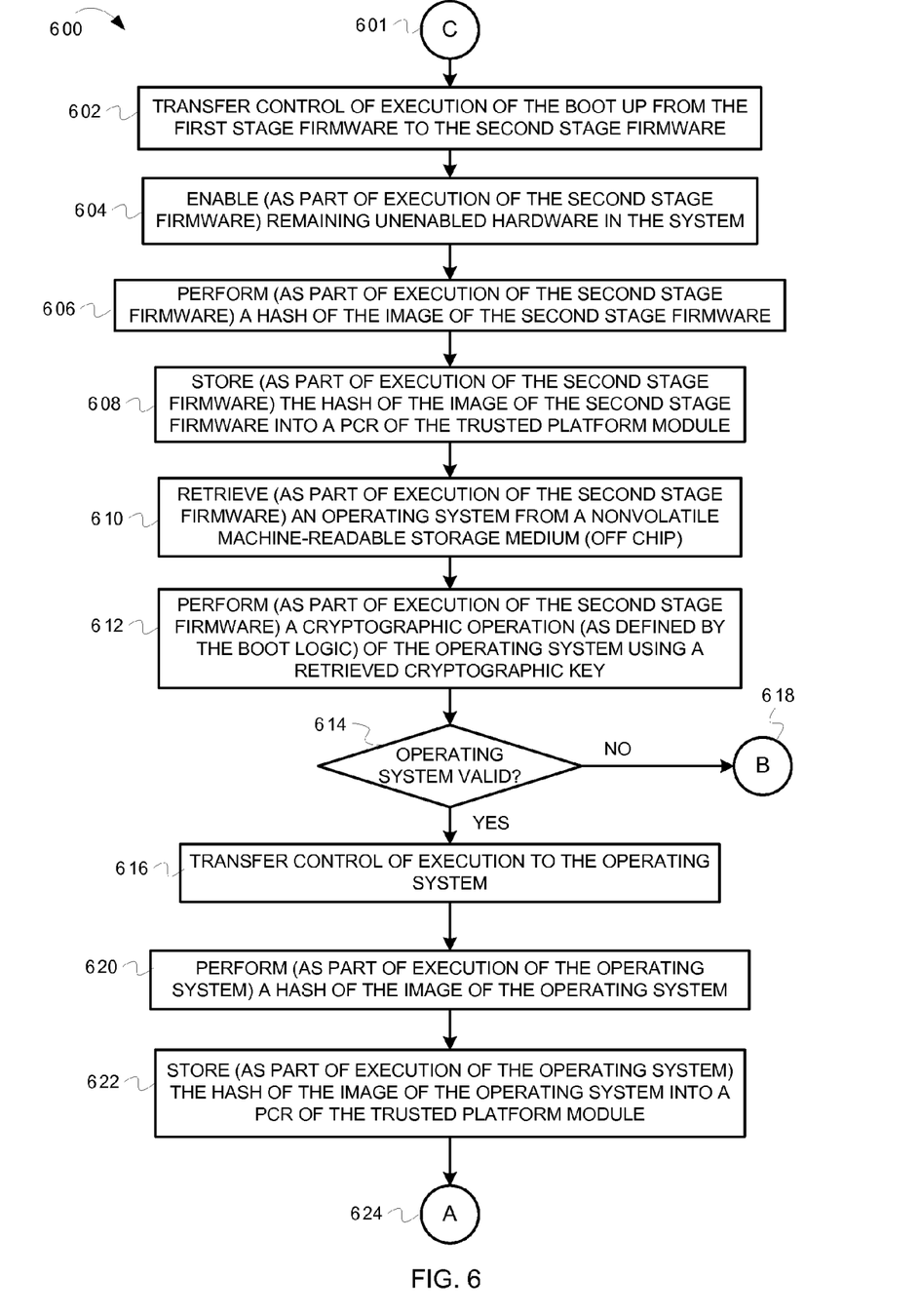

FIGS. 4-6 depict flowcharts for providing a secure boot up having a hardware based root of trust using digital signatures, according to some example embodiments. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flowchart.

A flowchart 500 of FIG. 5 is a continuation of a flowchart 400 of FIG. 4, and a flowchart 600 of FIG. 6 is a continuation of the flowchart 500 of FIG. 5. The operations of the flowchart 400 are first described; the operations of the flowchart 500 are then described; and the operations of the flowchart 600 are then described. The operations of the flowchart 400 begin at block 402. The operations are described with reference to the components of FIG. 2 (and can be applicable to the components of FIG. 3).

At block 402, upon power up or reset of the computer 200, one processor core is enabled (while allowing the remaining processor cores to remain disabled). For example, power and appropriate signaling can be supplied to one of the processor cores to activate. With reference to FIG. 2, the processor 216 is enabled. Operations of the flowchart 400 continue at block 404.

At block 404, the processor (that is enabled) retrieves initial stage instructions from an on-chip non-volatile read only machine-readable medium. With reference to FIG. 2, the processor 216 retrieves the initial stage instructions 226 from the ROM 220. Operations of the flowchart 400 continue at block 406.

At block 406, the processor retrieves (as part of execution of the initial stage instructions) boot up logic from on-chip nonvolatile read only machine-readable medium. With reference to FIG. 2, the processor 216 retrieves the boot up logic 228 from the programmable nonvolatile machine-readable medium 222. The processor 216 reads the boot logic 228 which identifies definitions on the type of cryptographic operations that are to be performed during the boot up and the location of the cryptographic keys that are used during the operation. In particular, the boot logic 228 can identify the type of cryptographic operations and location of cryptographic keys used to authenticate each of the multiple stages of firmware, the boot loader, and the operating system or hypervisor. Each of the multiple stages of firmware, the boot loader, and the operating system or hypervisor can be protected by confidentiality and integrity operations (e.g., encryption, Hash-based Message Authentication Code, digitally signed and or hash operation) or integrity operations only (digitally signed). Operations of the flowchart 400 continue at block 408.

At block 408, the processor determines (as part of execution of the initial stage instructions) secure storage location (either on-chip or off-chip) of cryptographic key(s) and that a types of cryptographic operation is to be performed for validation. With reference to FIG. 2, the boot logic 228 defines the location of the cryptographic key(s) and the types of cryptographic operations that are to be performed during the boot up. For example, the locations can include the programmable nonvolatile machine-readable medium 222 (that is on-chip) or the battery backed volatile machine-readable medium 206 (that is off-chip). With reference to the types of cryptographic operations, examples can include the use of digital signatures to validate the integrity and authentication of the code. In some example embodiments, a public key can be used for this cryptographic operation where the private key used to create the digital signature is stored and protected at the manufacturer. In some example embodiments, additional cryptographic operations can occur to further protect the code (where confidentiality is a requirement). For example, a symmetric algorithm (e.g., Advanced Encryption Standard (AES)) can be used to encrypt the code along with its digital signature, which together is protected by an HMAC using a different cryptographic key from the AES. These additional cryptographic operations are authenticated encryption used to protect the code. Operations of the flowchart 400 continue at block 410.

At block 410, the processor retrieves (as part of execution of the initial stage instructions) the cryptographic key(s) from the secure storage location (either on-chip or off-chip). For example, with reference to FIGS. 2-3, the processor 216 can retrieve the cryptographic key(s) from the programmable nonvolatile machine-readable medium 222 (that is on-chip) or the battery backed volatile machine-readable medium 206 (that is off-chip). Operations of the flowchart 400 continue at block 412.

At block 412, the processor retrieves (as part of execution of the initial stage instructions) a first stage firmware from an off-chip nonvolatile machine-readable storage medium. With reference to FIG. 2, the processor 216 retrieves the first firmware 230 from the reprogrammable nonvolatile machine-readable medium 204. Operations of the flowchart 400 continue at block 414.

At block 414, the processor performs (as part of execution of the initial stage instructions) the cryptographic operation (defined by the boot logic) of the first stage firmware using a retrieved cryptographic key. With reference to FIG. 2, the processor 216 performs the cryptographic operation (defined by the boot logic 228) using a retrieved cryptographic key. For example, the processor 216 can generate a digital signature for comparison to a stored digital signature, perform any type of decryption, etc. Operations of the flowchart 400 continue at block 416.

At block 416, the processor determines whether the first stage firmware is valid. With reference to FIG. 2, the processor 216 can make this determination. For example if the cryptographic operation is generation of a digital signature, the processor 216 can compare the generated digital signature to a digital signature that is stored with the first stage firmware 230. If the first stage firmware is not valid, the operations of the flowcharts 400-600 are complete. Otherwise, operations of the flowchart 400 continue at a continuation point A 418, which is a transition to the flowchart 500.

The flowchart 500 of FIG. 5 is now described. The flowchart 500 begins at a continuation point A 501 that is a continuation from the continuation point A 418 of the flowchart 400. From the continuation point A 501, operations continue at block 502.

At block 502, the processor transfers control of execution of the boot up from the initial stage instructions to the first stage firmware. With reference to FIG. 2, the processor 216 transfer control of execution of the boot up from the initial stage instructions 226 to the first stage firmware 230 (now being executed on the processor 216). In some example embodiments, prior to transfer to the first stage firmware 230, the processor 216 (as part of execution of the initial stage instructions 226) e-fuses the boot logic 228 in the programmable nonvolatile machine-readable medium 222 and precludes access to initial stage instructions stored in the ROM 220 to prevent access the code stored in the programmable nonvolatile machine-readable medium 222 and the ROM 220 by higher levels of software to be executed. Operations of the flowchart 500 continue at block 504.

At block 504, the processor enables (as part of execution of the first stage firmware) cryptographic processor and the TPM. With reference to FIG. 2, the processor 216 enables the cryptographic processor 290 and the TPM 210. For example, power and appropriate signaling can be supplied to the cryptographic processor 290 and the TPM 210 to activate. Operations of the flowchart 500 continue at block 506.

At block 506, the processor performs (as part of execution of the first stage firmware) a hash of the image of the first stage firmware. With reference to FIG. 2, a copy of the image of the first stage firmware 230 can remain in cache or other local storage relative to the processor 216. The processor 216 can create a hash over the image of the first stage firmware 230. Operations of the flowchart 500 continue at block 508.

At block 508, the processor stores (as part of execution of the first stage firmware) the hash of the image of the first stage firmware into a PCR of the TPM. With reference to FIG. 2, the processor 216 stores a value of the hash of the image of the first stage firmware 230 in one of the PCRs 236-238 of the TPM 210. As further described below, this hash value can be validated prior to handing control of the computer 200 to the operating system for general purpose operations. Operations of the flowchart 500 continue at block 510.

At block 510, the processor retrieves (as part of execution of the first stage firmware) a second stage firmware from the off-chip nonvolatile machine-readable storage medium. With reference to FIG. 2, the processor 216 retrieves the second stage firmware 232 from the reprogrammable nonvolatile machine-readable medium 204. Operations of the flowchart 500 continue at block 512.

At block 512, the cryptographic processor performs (as part of execution of the first stage firmware the cryptographic operation defined by the boot logic) of the second stage firmware using a retrieved cryptographic key. With reference to FIG. 2, the processor 216 can instruct the cryptographic processor 290 to perform the cryptographic operation (defined by the boot logic 228) using a retrieved cryptographic key. For example, the cryptographic processor 290 can generate a digital signature for comparison to a stored digital signature, perform any type of decryption, etc. The cryptographic operation and the cryptographic key can be the same or different from the cryptographic operation and the cryptographic key used for validating the first stage firmware. Operations of the flowchart 500 continue at block 514.

At block 514, the processor determines whether the second stage firmware is valid. With reference to FIG. 2, the processor 216 can make this determination. For example if the cryptographic operation is generation of a digital signature, the processor 216 can compare the generated digital signature to a digital signature that is stored with the second stage firmware 232. If the second stage firmware is not valid, operations of the flowchart 500 continue at a continuation point B 516, which continues at a continuation point B 420 of the flowchart 400, where the operations of the flowcharts 400-600 are complete. If the second stage firmware is valid, operations of the flowchart 500 continue at a continuation point C 518, which is a transition to the flowchart 600.

The flowchart 600 of FIG. 6 is now described. The flowchart 600 begins at a continuation point C 601 that is a continuation from the continuation point C 518 of the flowchart 500. From the continuation point C 601, operations continue at block 602.

At block 602, the processor transfers control of execution of the boot up from the first stage firmware to the second stage firmware. With reference to FIG. 2, the processor 216 transfer control of execution of the boot up from the first stage firmware 230 to the second stage firmware 232 (now being executed on the processor 216). Operations of the flowchart 600 continue at block 604.

At block 604, the processor enables (as part of execution of the second stage firmware) remaining unenabled hardware in the system. With reference to FIG. 2, the processor 216 can enable the other processors cores that are not yet enabled in the system on-chip 202 and the memory controller 212 to enable access to the volatile machine-readable medium 208, the volatile machine-readable medium 208, the hard disk drive 292, and associated logic for communications between these components and the processor 216. For example, power and appropriate signaling can be supplied to these components to activate. Operations of the flowchart 600 continue at block 606.

At block 606, the processor performs (as part of execution of the second stage firmware) a hash of the image of the second stage firmware. With reference to FIG. 2, a copy of the image of the second stage firmware 232 can remain in cache or other local storage relative to the processor 216. The processor 216 can create a hash over the image of the second stage firmware 232. Operations of the flowchart 600 continue at block 608.

At block 608, the processor stores (as part of execution of the second stage firmware) the hash of the image of the second stage firmware into a PCR of the TPM. With reference to FIG. 2, the processor 216 stores a value of the hash of the image of the second stage firmware 232 in one of the PCRs 236-238 of the TPM 210. As further described below, this hash value can be validated prior to handing control of the computer 200 to the operating system for general purpose operations. Operations of the flowchart 600 continue at block 610.

At block 610, the processor retrieves (as part of execution of the second stage firmware) an operating system from a nonvolatile machine-readable storage medium (off-chip). With reference to FIG. 2, the processor 216 retrieves the operating system 294 from the hard disk drive 292. Operations of the flowchart 600 continue at block 612.

At block 612, the cryptographic processor performs (as part of execution of the first stage firmware the cryptographic operation defined by the boot logic) of the operating system using a retrieved cryptographic key. With reference to FIG. 2, the processor 216 can instruct the cryptographic processor 290 to perform the cryptographic operation (defined by the boot logic 228) using a retrieved cryptographic key. For example, the cryptographic processor 290 can generate a digital signature for comparison to a stored digital signature, perform any type of decryption, etc. The cryptographic operation and the cryptographic key can be the same or different from the cryptographic operation and the cryptographic key used for validating the first stage firmware. Operations of the flowchart 600 continue at block 614.

At block 614, the processor determines whether the operating system is valid. With reference to FIG. 2, the processor 216 can make this determination. For example if the cryptographic operation is generation of a digital signature, the processor 216 can compare the generated digital signature to a digital signature that is stored with the second stage firmware 232. If the operating system is not valid, operations of the flowchart 500 continue at a continuation point B 618, which continues at the continuation point B 420 of the flowchart 400, where the operations of the flowcharts 400-600 are complete. If the operating system is valid, operations of the flowchart 600 continue at block 616.

At block 616, the processor transfers control of execution to the operating system. With reference to FIG. 2, the processor 216 transfer control of execution of the boot up from the second stage firmware 232 to the operating system 294 (now being executed on the processor 216). Operations of the flowchart 600 continue at block 618.

At block 618, the processor performs (as part of execution of the operating system) a hash of the image of the operating system. With reference to FIG. 2, a copy of the image of the operating system 294 can remain in cache or other local storage relative to the processor 216. The processor 216 can create a hash over the image of the operating system 294. Operations of the flowchart 600 continue at block 620.

At block 620, the processor stores (as part of execution of the operating system) the hash of the image of the operating system into a PCR of the TPM. With reference to FIG. 2, the processor 216 stores a value of the hash of the image of the operating system 294 in one of the PCRs 236-238 of the TPM 210. As further described below, this hash value can be validated prior to handing control of the computer 200 to the operating system for general purpose operations. Operations of the flowchart 600 are complete.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for secure boot up as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    performing a boot up of a computer having a system on-chip having multiple processors, a nonvolatile read-only machine-readable medium, and a programmable nonvolatile machine-readable medium, wherein the computer comprises a battery backed volatile machine-readable medium that is separate from the system on-chip and is communicatively coupled to the system on-chip, wherein the performing of the boot up comprises,
        enabling a first processor of the multiple processors, while maintaining others of the multiple processors in a disabled state;
        retrieving, by the first processor, initial stage instructions from the nonvolatile read-only machine-readable medium;
        executing, in the first processor, the initial stage instructions;
        retrieving a cryptographic key from at least one of the battery backed volatile machine-readable medium and the programmable nonvolatile machine-readable medium, wherein the programmable nonvolatile machine-readable medium that is part of the system on-chip is configured to store logic that identifies a type of cryptographic operation that is executed as part of validating each of the multiple stages of firmware and identifies a location of the cryptographic key;

retrieving the logic from the programmable nonvolatile machine-readable medium;

validating, at least in part by executing the initial stage instructions by the first processor, multiple stages of firmware separately, wherein the validating of the multiple stages of firmware includes performing at least one cryptographic operation based on the cryptographic key, wherein the validating of the multiple stages of firmware based on the cryptographic operation is performed as defined by the logic and using the cryptographic key whose location is defined by the logic;

in response to validating the multiple stages of firmware, executing the multiple stages of firmware in consecutive stages of the boot up, wherein executing of each stage of the multiple stages of firmware enables a different set of disabled hardware components of the computer;

validating, as part of execution of at least one of the multiple stages of firmware, an operating system, wherein the validating of the operating system includes performing at least one different cryptographic operation; and in response to validation of the operating system, transferring control of the computer to the operating system.

2. The method of claim 1, wherein the computer further comprises a nonvolatile machine-readable medium that is separate from the system on-chip and is communicatively coupled to the system on-chip, wherein the method further comprises:

retrieving, in response to executing the initial stage instructions by the first processor core and prior to validating the multiple stages of firmware, a first stage firmware of the multiple stages of firmware; and retrieving, in response to executing the first stage firmware by the first processor core and after validating the first stage firmware, a second stage firmware of the multiple stages of firmware.

3. The method of claim 1, wherein the computer further comprises a Trusted Platform Module (TPM) that is separate from the system on-chip and is communicatively coupled to the system on-chip, wherein the method further comprises:

generating, as part of executing a first stage firmware of the multiple stages of firmware after validating the first stage firmware, a first hash over an image of the first stage firmware;

storing, as part of executing the first stage firmware, the first hash into a first Platform Configuration Register (PCR) of the TPM;

generating, as part of executing a second stage firmware of the multiple stages of firmware after validating the second stage firmware, a second hash over an image of the second stage firmware; and storing, as part of executing the first stage firmware, the second hash into a second Platform Configuration Register (PCR) of the TPM.

4. A method comprising:

performing a boot up of a computer having a system on-chip having multiple processor cores and a read-only machine-readable medium and a programmable non-volatile machine-readable medium, the performing comprising, enabling a first processor core of the multiple processor cores, while maintaining others of the multiple processor cores in a disabled state;

retrieving, by the first processor core, initial stage instructions from the read-only machine-readable medium;

executing, in the first processor core, the initial stage instructions;

retrieving, as part of the executing of the initial stage instructions, a first stage firmware from a non-volatile machine-readable medium that is external to the system on-chip;

retrieving, as part of the executing of the initial stage instructions, at least one cryptographic key from at least one of the programmable nonvolatile machine-readable medium and a battery backed volatile machine-readable medium that is external to the system on-chip;

wherein the programmable nonvolatile machine-readable medium that is part of the system on-chip is configured to store logic that identifies a type of a first cryptographic operation and a type of a second cryptographic operation;

retrieving the logic from the programmable nonvolatile machine-readable medium, prior to validating the first stage firmware;

validating, as part of the executing of the initial stage instructions, the first stage firmware based on the first cryptographic operation using the at least one cryptographic key;

in response to validation of the first stage firmware, transferring, as part of the executing of the initial stage instructions, control of the boot up to the first stage firmware;

retrieving, as part of executing of the first stage firmware, a second stage firmware from the non-volatile machine-readable medium that is external to the system on-chip;

validating, as part of the executing of the first stage firmware, the second stage firmware based on the second cryptographic operation using the at least one cryptographic key;

in response to validation of the second stage firmware, transferring, as part of the executing of the first stage firmware, control of the boot up to the second stage firmware;

retrieving, as part of executing of the second stage firmware, an operating system;

validating, as part of the executing of the second stage firmware, the operating system based on a third cryptographic operation using the at least one cryptographic key; and in response to validation of the operating system, transferring, as part of the executing of the second stage firmware, control of the computer to the operating system.

5. The method of claim 4, wherein the programmable nonvolatile machine-readable medium that is part of the system on-chip is configured to store logic that identifies a location of the at least one cryptographic key.

6. The method of claim 4, wherein the computer further comprises a Trusted Platform Module (TPM) that is separate from the system on-chip and is communicatively coupled to the system on-chip, wherein the method further comprises:

generating, as part of executing a first stage firmware after validating the first stage firmware, a first hash over an image of the first stage firmware;

storing, as part of executing the first stage firmware, the first hash into a first Platform Configuration Register (PCR) of the TPM;

generating, as part of executing a second stage firmware after validating the second stage firmware, a second hash over an image of the second stage firmware; and storing, as part of executing the first stage firmware, the second hash into a second Platform Configuration Register (PCR) of the TPM.

7. The method of claim 4, further comprising:

enabling, as part of execution of the first stage firmware, a first set of disabled hardware components of the computer that were disabled during execution of the initial stage instructions; and enabling, as part of execution of the second stage firmware, a second set of disabled hardware components of the computer that were disabled during execution of the initial stage instructions and the first stage firmware.

8. An apparatus comprising:

a nonvolatile machine-readable medium configured to store a first stage firmware and a second stage firmware that are cryptographically protected; and a system on-chip communicatively coupled to the nonvolatile machine-readable medium, the system on-chip comprising, multiple processors, wherein a first processor of the multiple processors is enabled initially during boot up of the apparatus while others of the multiple processors are disabled initially during boot up of the apparatus; and a nonvolatile read-only machine-readable medium configured to store initial stage instructions; and a programmable nonvolatile machine-readable medium that is configured to store logic that identifies a type of the first cryptographic operation and a type of the second cryptographic operation;

wherein the first processor is configured to perform the following during the boot up of the apparatus, retrieve the initial stage instructions from the nonvolatile read-only machine-readable medium;

retrieve the logic from the programmable nonvolatile machine-readable medium, prior to validation of the first stage firmware;

validate, as part of execution the initial stage instructions, the first stage firmware based on the first cryptographic operation using at least one cryptographic key;

in response to validation of the first stage firmware, transfer, as part of the execution of the initial stage instructions, control of the boot up to the first stage firmware;

enable, as part of execution of the first stage firmware, a first set of disabled hardware components of the apparatus;

validate, as part of execution of the first stage firmware, a second stage firmware based on the second cryptographic operation using the at least one cryptographic key;

in response to validation of the second stage firmware, transfer, as part of execution of the first stage firmware, control of the boot up to the second stage firmware;

enable, as part of execution of the second stage firmware, a second set of disabled hardware components of the apparatus;

validate, as part of execution of the second stage firmware, an operating system based on a third cryptographic operation using the at least one cryptographic key; and in response to validation of the operating system, transfer, as part of the executing of the second stage firmware, control of the apparatus to the operating system.

9. The apparatus of claim 8, wherein the programmable nonvolatile machine-readable medium that is part of the system on-chip is configured to store logic that identifies a location of the at least one cryptographic key.

10. The apparatus of claim 8, further comprising a Trusted Platform Module (TPM) that is separate from the system on-chip and is communicatively coupled to the system on-chip, wherein the first processor is configured to, generate, as part of execution a first stage firmware after validation of the first stage firmware, a first hash over an image of the first stage firmware;

store, as part of execution the first stage firmware, the first hash into a first Platform Configuration Register (PCR) of the TPM;

generate, as part of execution a second stage firmware after validation of the second stage firmware, a second hash over an image of the second stage firmware; and store, as part of execution of the first stage firmware, the second hash into a second Platform Configuration Register (PCR) of the TPM.

11. The apparatus of claim 8, wherein the first set of disabled hardware components comprises a cryptographic processor and a Trusted Platform Module.

12. A computer program product for boot up of a computer, the computer program product comprising:

a non-transitory computer readable storage medium having computer usable program code embodied therewith, the computer usable program code comprising a computer usable program code configured to:

perform a boot up of the computer having a system on-chip having multiple processors, a nonvolatile read-only machine-readable medium, and a programmable nonvolatile machine-readable medium, wherein the computer comprises a battery backed volatile machine-readable medium that is separate from the system on-chip and is communicatively coupled to the system on-chip, the boot up comprising, enable a first processor of the multiple processors, while maintaining others of the multiple processors in a disabled state;

retrieve, by the first processor core, initial stage instructions from the nonvolatile read-only machine-readable medium;

execute, in the first processor, the initial stage instructions;

retrieve a cryptographic key from at least one of the battery backed volatile machine-readable medium and the programmable nonvolatile machine-readable medium, wherein the programmable nonvolatile machine-readable medium that is part of the system on-chip is configured to store logic that identifies a type of cryptographic operation that is executed as part of validating each of the multiple stages of firmware and identifies a location of the cryptographic key;

retrieve the logic from the programmable nonvolatile machine-readable medium;

validate, at least in part by executing the initial stage instructions by the first processor, multiple stages of firmware separately, wherein the validation of the multiple stages of firmware includes performance of at least one cryptographic operation based on the cryptographic key, wherein the validating of the multiple stages of firmware based on the cryptographic operation is performed as defined by the logic and using the cryptographic key whose location is defined by the logic;

in response to validation of the multiple stages of firmware, execute the multiple stages of firmware in consecutive stages of the boot up, wherein execution of each stage of the multiple stages of firmware enables a different set of disabled hardware components of the computer;

validate, as part of execution of at least one of the multiple stages of firmware, an operating system, wherein the validation of the operating system includes performance at least one different cryptographic operation; and in response to validation of the operating system, transfer control of the computer to the operating system.

13. The computer program product of claim 12, wherein the computer further comprises a nonvolatile machine-readable medium that is separate from the system on-chip and is communicatively coupled to the system on-chip, wherein the boot up further comprises:

retrieve, in response to execution of the initial stage instructions by the first processor core and prior to validation of the multiple stages of firmware, a first stage firmware of the multiple stages of firmware; and retrieve, in response to execution of the first stage firmware by the first processor core and after validation of the first stage firmware, a second stage firmware of the multiple stages of firmware.

14. The computer program product of claim 12, wherein the computer further comprises a Trusted Platform Module (TPM) that is separate from the system on-chip and is communicatively coupled to the system on-chip, wherein the boot up further comprises:

generate, as part of execution of a first stage firmware of the multiple stages of firmware after validating the first stage firmware, a first hash over an image of the first stage firmware;

store, as part of execution of the first stage firmware, the first hash into a first Platform Configuration Register (PCR) of the TPM;

generate, as part of execution of a second stage firmware of the multiple stages of firmware after validation of the second stage firmware, a second hash over an image of the second stage firmware; and store, as part of execution of the first stage firmware, the second hash into a second Platform Configuration Register (PCR) of the TPM.

* * * * *